Patented July 3, 1928.

1,675,430

UNITED STATES PATENT OFFICE.

LINCOLN M. SHAFER, OF JERSEY CITY, NEW JERSEY, ASSIGNOR TO TOWER MANUFACTURING CO., INC., A CORPORATION OF NEW YORK.

SULPHUR DYESTUFF.

No Drawing. Application filed January 18, 1926. Serial No. 82,135.

This invention relates to a new sulphur dyestuff, particularly one for dyeing cotton goods in colors ranging from tan to greenish bronze, and for producing khaki shades.

It is generally known that when a mixture of meta-toluene diamine and paraphenylene diamine are fused with sulphur, olive to khaki shades are obtained. (See U. S. P. 904,809.) The dyestuff is tinctorially weak and too expensive to allow of its commercial use in dyeing khaki shades. It is also generally known that a mixture of meta-toluene diamine and dehydro-thio-paratoluidine, when fused with sulphur, gives a product insoluble in sodium sulphide and which is not suitable as a sulphur dyestuff.

Now, I have discovered that when a mixture of meta-toluene diamine, dehydro-thio-paratoluidine and paraphenylene diamine (or paranitraniline) are fused with sulphur, valuable sulphur colors of very high tinctorial value are obtained. The dyestuff products obtained are yellowish-brown powders, insoluble in water, caustic soda solution, concentrated sulphuric acid and sulphur chloride. They are soluble in sodium sulfide solution with a yellowish-tan color, and dye cotton the same shade, which turns somewhat greener when oxidized in the air. On after treating with chrome, copper and acetic acid, the change in shade is very slight, becoming somewhat darker and greener.

The chrome used is either commercial sodium dichromate $Na_2Cr_2O_7.2H_2O$, or commercial potassium dichromate $K_2Cr_2O_7$.

The formula for metatoluenediamine is as follows:

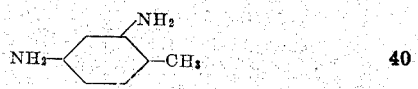

The formula for dehydrothioparatoluidine is as follows:

and the formula for paraphenylenediamine is as follows:

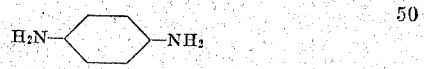

Dehydrothio paratoluidine when heated with sulphur and paratoluidine is converted into primuline base, as per following reaction:

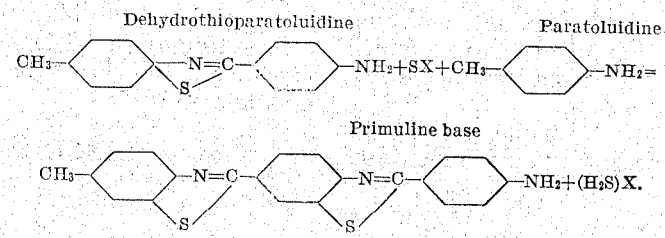

The following examples will illustrate the invention:—

Example 1.

Sixty parts meta-toluene diamine, 14 parts dehydro-thio-toluidine and 16 parts paraphenylene diamine are heated together with 270 parts of sulphur for eight hours at 215° to 230° C. When cold the melt is pulverized and heated at about 100° C. with 600 parts of crystalline sodium sulfide dissolved in 3000 parts of water for several hours, or until the solution of the melt is complete. The mixture is then diluted with water and the dyestuff is precipitated with dilute acids. It is filtered off, dried and ground.

Example 2.

Forty-five parts meta-toluene diamine, 20 parts dehydro-thio-toluidine and 25 parts paraphenylene diamine are heated together with 270 parts of sulphur for 10 hours at 215° to 235° C. The crude melt is worked up in the manner described in Example 1. A greenish-bronze shade is obtained.

*Example 3.*

Forty-eight parts meta-toluene diamine, 20 parts dehydro-thio-toluidine, 40 parts paranitraniline are heated together with 270 parts of sulphur at 220° to 240° C. for six hours whereupon the crude melt is worked up in the manner already described.

*Example 4.*

Fifty parts meta-toluene diamine, 20 parts of primuline base, and 20 parts paraphenylene diamine are heated together with 290 parts of sulphur at 215° to 230° C. for ten hours and then the melt is worked up in the manner already described.

The proportions of the components and temperatures may be varied within reasonable limits without affecting the solubility of the dyestuff. Paranitraniline may be substituted for paraphenylene diamine, and primuline base may be substituted for dehydro-thio-paratoluidine, and they are to be considered as equivalents in this patent.

The properties of the new dye or dyes are generally as follows:—

The dyes thus produced dye cotton goods in shades ranging from a tan to a greenish-bronze, in a sodium sulphide bath; and the particular shade obtained is, to a certain extent, dependent upon the proportions of the components, the shade being reddened as the proportion of meta-toluene diamine is increased, and being turned greener as the proportion of dehydro-thio-toluidine or paraphenylene diamine is increased. Generally speaking, if the goods are given an after treatment with chrome, copper and acetic acid, the change in shade is very slight, becoming somewhat darker and greener.

Upon admixture with sulphur black, fast khaki shades are obtained direct, which change but slightly on after treatment with chrome and copper.

The dyestuff is very valuable in that it is much stronger tinctorially and much less expensive than previous khaki and similar dyes for cotton goods made from various diamines, and it is soluble in sodium sulphide and adapted to be used as a sulphur dyestuff which is not possible with a diamine and toluidine combination hitherto effected.

As many apparently widely different embodiments of this invention may be made without departing from the spirit thereof, it is understood that I do not intend to limit myself to the specific embodiment above described, except as indicated in the appended claims.

I claim:—

1. A sulphur dyestuff resulting from the reaction of sulphur on a meta-diamine, a para-diamine, and dehydro-thiotoluidine, having the characteristics of being insoluble in water but soluble in aqueous sodium sulphide with a yellowish-tan color, and having the property of dyeing unmordanted cotton in a bath containing sodium sulphide in shades ranging from tan to greenish-bronze.

2. A sulphur dyestuff resulting from the reaction of meta-toluene diamine, paraphenylene diamine and dehydro-thiotoluidine, having the characteristics of being insoluble in water but soluble in aqueous sodium sulphide with a yellowish-tan color, and having the property of dyeing unmordanted cotton in a bath containing sodium sulphide in shades ranging from tan to greenish-bronze.

3. A sulphur dyestuff resulting from the reaction of sulphur on meta-toluene diamine, paraphenylene diamine and dehydro-thiotoluidine, having the characteristics of being insoluble in water but soluble in aqueous sodium sulphide with a yellowish-tan color, and having the property of dyeing unmordanted cotton in a bath containing sodium sulphide in shades ranging from tan to greenish-bronze, which become darker and greener upon after treatment with chrome, copper and acetic acid.

In testimony that I claim the foregoing, I have hereunto set my hand this 11th day of January, 1926.

LINCOLN M. SHAFER.